United States Patent [19]

Shiraishi et al.

[11] Patent Number: 5,656,582
[45] Date of Patent: Aug. 12, 1997

[54] RUST PREVENTIVE LUBRICATING OIL

[75] Inventors: Emiko Shiraishi; Hiroyuki Ito; Masao Yamamoto; Michiharu Naka; Akira Suzuki; Shigeki Maehara, all of Kanagawa, Japan

[73] Assignee: NSK Limited, Tokyo, Japan

[21] Appl. No.: 667,042

[22] Filed: Jun. 21, 1996

Related U.S. Application Data

[63] Continuation of Ser. No. 337,026, Nov. 7, 1994, abandoned.

[30] Foreign Application Priority Data

Nov. 11, 1993 [JP] Japan ................................. 5-282531

[51] Int. Cl.$^6$ ............................................. C10M 141/02
[52] U.S. Cl. ........................... 508/108; 508/100; 508/581; 508/408; 508/409; 508/410
[58] Field of Search ........................ 508/100, 108, 508/408, 409, 410, 581

[56] References Cited

U.S. PATENT DOCUMENTS

| | | | |
|---|---|---|---|
| 3,926,820 | 12/1975 | Dickert, Jr. et al. | 252/33 |
| 4,051,047 | 9/1977 | Liston | 252/33 |
| 4,464,275 | 8/1984 | Yasui . | |
| 5,104,558 | 4/1992 | Matsuzaki . | |
| 5,207,935 | 5/1993 | Waynick . | |

FOREIGN PATENT DOCUMENTS

| | | |
|---|---|---|
| 10010858 | 5/1980 | European Pat. Off. . |
| 10414191 | 2/1991 | European Pat. Off. . |
| 659072 | 10/1951 | United Kingdom . |
| 2117787 | 10/1983 | United Kingdom . |

OTHER PUBLICATIONS

Derwent WPI Abstract—JP57172997 date unavailable.
Derwent WPI Abstract—JP06200276 date unavailable.
Derwent WPI Absract—JP62074998 date unavailable.

Primary Examiner—Jacqueline V. Howard
Attorney, Agent, or Firm—Cushman Darby & Cushman IP Group of Pillsbury Madison & Sutro, LLP

[57] ABSTRACT

The rust preventive lubricating oil of the present invention concerns a base oil and a rust-preventive agent in an amount of 2–20% by weight on the basis of the whole rust preventive lubricating oil, wherein the base oil contains an ether oil in an amount of at least 20% by weight on the basis of the whole rust preventive lubricating oil. The rust preventive lubricating oil can be applied to the surface of raceway tracks of inner and outer rings, cages for bearings, as well as to bearings, to prevent development of rust, to inhibit generation of cage sound, and to obtain good lubricity, while retaining good compatibility with a grease to be later charged.

5 Claims, No Drawings

RUST PREVENTIVE LUBRICATING OIL

This is a continuation of application Ser. No. 08/337,026, filed on Nov. 7, 1994.

The present invention relates to a rust preventive lubricating oil and particularly, to a rust preventive lubricating oil which prevents bearings from rusting without adversely affecting various characteristics of bearings such as torque, sound and life.

Conventional rust preventive lubricating oils aim principally at improvement of lubricity. Therefore, a mixture comprising a mineral oil, a rust-preventive agent and an antioxidant has been used and the mixture generally has a viscosity of about 120–500 $mm^2 \cdot S^{-1}/40°$ C.

These rust preventive lubricating oils are used properly depending upon purposes of use. Normally, they are applied to rolled steel sheets as intermediate rust preventive oils before the steel sheets are used at the subsequent step or are applied to internal combustion engines for both the rust prevention and the lubrication.

When the conventional rust preventive lubricating oils are applied to rolled steel sheets or internal combustion engines, satisfactory rust preventive effect can be obtained. However, even a slight rust greatly affects the bearing performances. When they are used for small bearings such as sealed ball bearings, sufficient rust preventive effect cannot be obtained.

Of course, rust preventing action can be enhanced by using sulfonates as a rust-preventive agent. However, increase in the amount of the sulfonates used gives adverse effects on the characteristics of bearings such as torque, sound and life and on the compatibility with greases charged in the bearings. Accordingly, amount of the sulfonates must be determined considering the balancing with the characteristics of bearings.

For the sealed ball bearings, mode of lubrication varies depending on the difference in the manner of charging of the grease, and there is a case where the initial lubrication is not performed by the charged grease, but is performed by the rust preventive lubricating oil applied to the raceway track of bearings. In this case, the conventional mineral oil type rust preventive lubricating oils referred to hereabove cannot fulfill their function.

The present invention has been accomplished in order to solve the above-mentioned problems of conventional rust preventive lubricating oils.

The object of the present invention is to provide a rust preventive lubricating oil which does not give adverse effect on the various characteristics of bearings and the lubricity of greases and has a sufficient rust preventing power.

The present invention relates to a rust preventive lubricating oil which comprises a base oil and a rust-preventive agent in an amount of 2–20% by weight on the basis of the whole rust preventive lubricating oil, said base oil containing an ether oil in an amount of at least 20% by weight on the basis of the whole rust preventive lubricating oil.

The rust preventive lubricating oil of the present invention contains a rust-preventive agent and a base oil as essential components. This base oil must contain an ether oil.

The rust preventive lubricating oil of the present invention may further contain additives such as oiliness improvers, alcoholic solvents and antioxidants.

The contents of the components are based on "the whole rust preventive lubricating oil" unless otherwise notified.

When the rust preventive lubricating oil of the present invention is applied to the bearings such as sealed ball bearings, it exhibits excellent rust preventing action without damaging the various characteristics such as torque, sound and life. For example, when a sodium-based grease is charged in a sealed ball bearing, the grease cures initially or with lapse of time due to absorption of water to deteriorate flowability, resulting in increase of cage sound of the bearing to give adverse effect on acoustic performance. The phenomonon of increase in cage sound after operation of bearing for a certain period can be inhibited by previously applying the rust preventive lubricating oil of the present invention to the raceway track surface of inner and outer rings, the cage and the balls of sealed ball bearings.

Furthermore, ball bearings in which the rust preventive lubricating oil of the present invention is used are excellent in endurance performance and performances such as cage sound after subjected to endurance test, compatibility with greases, torque, initial cage sound and rust prevention.

The rust preventive lubricating oil of the present invention will be explained in more detail.

Any rust-preventive agents may be used in the present invention. Preferred are synthetic or petroleum sulfonates which are superior in rust prevention. As the synthetic sulfonic acids, there may be used, for example, diphenylnaphthalenesulfonic acid and heavy alkylbenzene-sulfonic acids. As the petroleum sulfonic acids, there may be used sulfonation products of aromatic components in lubricating oil fractions. Normally, those of about 500 in molecular weight can be suitably used. Especially preferred are calcium sulfonate containing calcium as a metal element and barium sulfonate containing barium as a metal element and mixtures thereof.

Content of the rust-preventive agent in the rust preventive lubricating oil is 2–20% by weight based on the whole rust preventive lubricating oil. If the content is less than 2% by weight, the rust preventing action is deteriorated. If the content exceeds 20% by weight, a large amount of the rust-preventive agent incorporates into the grease filled in the bearing to soften the grease and as a result the life of grease is shortened.

The ether oil contained in the base oil used in the present invention is one which is called a phenyletheric type synthetic lubricating oil and contains an alkyldiphenyl ether and/or a polyphenyl ether.

The ether oils are preferably alkyldiphenyl ethers for reducing the cage sound of bearings and improving endurance of bearings. The alkyldiphenyl ethers include, for example, "MORESCO-HILUBE" manufactured by Matsumura Sekiyu Kenkyujo K.K.

When alkyldiphenyl ethers are used as the ether oil, it is preferable to use calcium sulfonate in combination as a rust-preventive agent.

The alkyldiphenyl ethers per se and the polyphenyl ethers per se can be used as the ether oils.

As the base oil, there may be used the ether oil per se alone.

Furthermore, mixtures of the ether oil with at least one oil selected from mineral oils, synthetic oils and ester oils (hereinafter sometimes referred to as "ether oil-containing mixture") can also be used as the base oil.

As the mineral oils, there may be used various ones.

As the synthetic oils, there may be suitably used, for example, poly-α-olefins, ethylene-α-olefin oligomers and aromatic synthetic hydrocarbon oils.

As the ester oils, there may be suitably used, for example, diester oils, hindered ester oils and complex ester oils.

When the above-mentioned ether oil-containing mixture is used as a base oil, the cost can be reduced as compared with using the ether oil per se alone as the base oil without damaging the acoustic performance of bearings (reduction of cage sound) and the endurance performances of bearings.

Content of ether oil in the ether oil-containing mixture used as a base oil is preferably 20% by weight or more. If it is less than 20% by weight, the acoustic performance of bearings can be secured with difficulty.

Viscosity of the ether oil per se and the ether oil-containing mixture used as a base oil in the rust preventive lubricating oil of the present invention is usually 10–100 $mm^2 \cdot S^{-1}/40°$ C. If the viscosity is lower than 10 $mm^2 \cdot S^{-1}/40°$ C., increase in the endurance of bearings cannot be expected. If it is more than 100 $mm^2 \cdot S^{-1}/40°$ C., the action to inhibit generation of cage sound is insufficient.

The rust preventive lubricating oil of the present invention can contain an oiliness improver together with the rust-preventive agent and the base oil. The oiliness improver further improves lubricating performances such as wear resistance.

The oiliness improvers include, for example, higher alcohols, carboxylic acids such as oleic acid, amines such as stearylamine, organomolybdenum compounds such as molybdenum dithiophosphate, phosphate esters such as tricresyl phosphate, phosphor-based and sulfur-based additives and mixtures of them such as a mixture of oleic acid and tricresyl phosphate. The phosphor-based oiliness improvers excellent in improvement of endurance are preferred, and phosphate esters are especially preferred.

Content of the oiliness improver is preferably 1–10% by weight on the basis of the whole rust preventive lubricating oil. If the content is less than 1% by weight, no great improvement of the lubricating performances can be expected. If it is more than 10% by weight, a large amount of excess oiliness improver incorporates into the grease filled in the bearing to cause degradation or softening of the grease to increase the possibility of considerable deterioration in bearing lubricating performances.

The rust preventive lubricating oil of the present invention can further contain alcoholic solvents, antioxidants and other additives.

The rust preventive lubricating oils of the present invention are suitably used for bearings provided with an outer ring having an outer ring raceway track on its inner periphery, an inner ring having an inner raceway track on its outer periphery, a plurality of balls provided between the outer ring track and the inner ring track and a cage which hold the balls so that they can freely roll, especially small bearings such as sealed ball bearings. Besides, they are applied to steel sheets at the intermediate rolling step or to internal combustion engines.

When they are used as lubricants for bearings, they are applied to the surface of bearings or are incorporated into greases filled in the bearings.

The present invention will be explained in the following examples and comparative examples.

(A) Preparation of samples:

At least one of calcium sulfonate and barium sulfonate in a given amount within the range of 2–20% by weight based on the whole rust preventive lubricating oil was added as a rust-preventive agent to a base oil containing an alkyldiphenyl ether to prepare samples of Examples 1–16 shown in Tables 1 and 2. An oiliness improver was further added to the samples of Examples 11–16. Furthermore, to all of the samples were added an alcoholic solvent (butyl cellosolve for Samples 1–8 and 3-methyl-3-methoxy butanol for Samples 9–16) and DBPC (2,6-di-tert-butyl-P-cresol) as an antioxidant.

TABLE 1

Unit of viscosity: cSt = $mm^2 \cdot S^{-1}$

| | Examples | | | |
|---|---|---|---|---|
| Composition | 1 | 2 | 3 | 4 |
| Rust preventive lubricating oil | | | | |
| Base oil | Alkyldiphenyl ether (17 cSt) [87.5] | Alkyldiphenyl ether (100 cSt) [87.5] | Alkyldiphenyl ether (17 cSt) [93.5] | Alkyldiphenyl ether (17 cSt) [81.5] |
| Rust-preventive agent | Ca sulfonate [9] | Ca sulfonate [9] | Ca sulfonate [3] | Ca sulfonate [15] |
| Oiliness improver | | | | |
| Alcoholic solvent | Butyl cellosolve [2] | Butyl cellosolve [2] | Butyl cellosolve [2] | Butyl cellosolve [2] |
| Antioxidant | DBPC [1.5] | DBPC [1.5] | DBPC [1.5] | DBPC [1.5] |
| Endurance | X | X | X | X |
| Cage sound after endurance test | X | X | X | X |
| Compatibility with grease | X | X | X | X |
| Rotation torque | X | X | X | X |
| Initial cage sound | X | X | X | X |
| Rust prevention | X | X | X | X |

TABLE 1-continued

Unit of viscosity: cSt = mm$^2$ · S$^{-1}$

| Composition | Examples | | | |
|---|---|---|---|---|
| | 5 | 6 | 7 | 8 |
| Rust preventive lubricating oil | | | | |
| Base oil | Alkyldiphenyl ether (17 cSt) [44] and mineral oil (20 cSt)[43.5] | Alkyldiphenyl ether (17 cSt) [20] and mineral oil (20 cSt)[67.5] | Alkyldiphenyl ether (17 cSt) [20] and PAO (20 cSt)[67.5] | Alkyldiphenyl ether (17 cSt) [20] and ester oil (12 cSt)[67.5] |
| Rust-preventive agent | Ca sulfonate [9] | Ca sulfonate [9] | Ca sulfonate [9] | Ca sulfonate [3] |
| Oiliness improver | | | | |
| Alcoholic solvent | Butyl cellosolve [2] | Butyl cellosolve [2] | Butyl cellosolve [2] | Butyl cellosolve [2] |
| Antioxidant | DBPC [1.5] | DBPC [1.5] | DBPC [1.5] | DBPC [1.5] |
| Endurance | X | X | X | X |
| Cage sound after endurance test | X | X | X | X |
| Compatibility with grease | X | X | X | X |
| Rotation torque | X | X | X | X |
| Initial cage sound | X | X | X | X |
| Rust prevention | X | X | X | X |

TABLE 2

Unit of viscosity: cSt = mm$^2$ · S$^{-1}$

| Composition | Examples | | | |
|---|---|---|---|---|
| | 9 | 10 | 11 | 12 |
| Rust preventive lubricanting oil | | | | |
| Base oil | Alkyldiphenyl ether (17 cSt) [20] and mineral oil (20 cSt) [67.5] | Alkyldiphenyl ether (17 cSt) [20] and mineral oil (20 cSt) [67.5] | Alkyldiphenyl ether (17 cSt) [20] and mineral oil (20 cSt) [66.5] | Alkyldiphenyl ether (17 cSt) [20] and mineral oil (20 cSt) [58.5] |
| Rust-preventive agent | Ba sulfonate [9] | Ba sulfonate [4.5] and Ca sulfonate [4.5] | Ca sulfonate [9] | Ca sulfonate [9] |
| Oiliness improver | | | Tricresyl phosphate [1] | Tricresyl phosphate [9] |
| Alcoholic solvent | 3-Methyl-3 methoxy butanol [2] | 3-Methyl-3 methoxy butanol [2] | 3-Methyl-3 methoxy butanol [2] | 3-Methyl-3 methoxy butanol [2] |
| Antioxidant | DBPC [1.5] | DBPC [1.5] | DBPC [1.5] | DBPC [1.5] |
| Endurance | X | X | X | X |
| Cage sound after endurance test | X | X | X | X |
| Compatibility with grease | X | X | X | X |
| Rotation torque | X | X | X | X |
| Initial cage sound | X | X | X | X |
| Rust prevention | X | X | X | X |

TABLE 2-continued

Unit of viscosity: cSt = mm² · S⁻¹

| | Examples | | | |
|---|---|---|---|---|
| Composition | 13 | 14 | 15 | 16 |
| Rust preventive lubricating oil | | | | |
| Base oil | Alkyldiphenyl ether (17 cSt) [20] and mineral oil (20 cSt) [62.5] | Alkyldiphenyl ether (17 cSt) [20] and mineral oil (20 cSt) [62.5] | Alkyldiphenyl ether (17 cSt) [20] and mineral oil (20 cSt) [62.5] | Alkyldiphenyl ether (17 cSt) [20] and mineral oil (20 cSt) [61.5] |
| Rust-preventive agent | Ca sulfonate [9] | Ca sulfonate [9] | Ca sulfonate [9] | Ca sulfonate [9] |
| Oiliness improver | Oleic acid [5] | Molybdenum dithiophosphate [5] | Stearylamine [5] | Oleic acid [3] and tricresyl phosphate [3] |
| Alcoholic solvent | 3-Methyl-3 methoxy butanol [2] | 3-Methyl-3 methoxy butanol [2] | 3-Methyl-3 methoxy butanol [2] | 3-Methyl-3 methoxy butanol [2] |
| Antioxidant | DBPC [1.5] | DBPC [1.5] | DBPC [1.5] | DBPC [1.5] |
| Endurance | X | X | X | X |
| Cage sound after endurance test | X | X | X | X |
| Compatibility with grease | X | X | X | X |
| Rotation torque | X | X | X | X |
| Initial cage sound | X | X | X | X |
| Rust prevention | X | X | X | X |

On the other hand, samples as shown in Tables 3 and 4 were prepared as those for comparative examples. The base oil contained at least one of an alkyldiphenyl ether, an ester, a mineral oil and PAO (poly-α-olefin) as an ether oil. In Comparative Example 1, the rust-preventive agent was not added. In Comparative Examples 2–12, at least one of calcium sulfonate and barium sulfonate was added as the rust-preventive agent. Contents are as shown in the Tables. In Comparative Examples 3–5, an oiliness improver was added. The same alcoholic solvents and the antioxidants as used in the Examples were added to all samples of the Comparative Examples.

TABLE 3

Unit of viscosity: cSt = mm² · S⁻¹

| | Comparative Examples | | | |
|---|---|---|---|---|
| Composition | 1 | 2 | 3 | 4 |
| Rust preventive lubricating oil | | | | |
| Base oil | Alkyldiphenyl ether (17 cSt) [96.5] | Alkyldiphenyl ether (17 cSt) [74.5] | Alkyldiphenyl ether (17 cSt) [75.5] | Alkyldiphenyl ether (17 cSt) [69.5] |
| Rust-preventive agent | | Ca sulfonate [22] | Ca sulfonate [9] | Ca sulfonate [11] and Ca sulfonate [11] |
| Oiliness improver | | | Tricresyl phosphate [12] | Tricresyl phosphate [5] |
| Alcoholic solvent | 3-Methyl-3 methoxy butanol [2] | 3-Methyl-3 methoxy butanol [2] | 3-Methyl-3 methoxy butanol [2] | 3-Methyl-3 methoxy butanol [2] |
| Antioxidant | DBPC [1.5] | DBPC [1.5] | DBPC [1.5] | DBPC [1.5] |
| Endurance | X | ◊ | Δ | ◊ |
| Cage sound after endurance test | X | ◊ | Δ | ◊ |
| Compatibility with grease | X | ◊ | ◊ | ◊ |
| Rotation torque | X | X | X | X |
| Initial cage sound | X | X | X | X |
| Rust prevention | ◊ | X | X | X |

TABLE 3-continued

Unit of viscosity: cSt = mm$^2$ · S$^{-1}$

| | Comparative Examples | | | |
|---|---|---|---|---|
| Composition | 5 | 6 | 7 | 8 |
| Rust preventive lubricating oil | | | | |
| Base oil | Alkyldiphenyl ether (17 cSt) [17] and mineral oil (20 cSt) [65.5] | Alkyldiphenyl ether (17 cSt) [17] and mineral oil (20 cSt) [70.5] | Alkyldiphenyl ether (17 cSt) [17] and PAO (20 cSt)[70.5] | Alkyldiphenyl ether (17 cSt) [17] and ester oil (12 cSt) [70.5] |
| Rust-preventive agent | Ca sulfonate [9] | Ca sulfonate [9] | Ca sulfonate [9] | Ca sulfonate [3] |
| Oiliness improver | Tricresyl phosphate [5] | | | |
| Alcoholic solvent | 3-Methyl-3 methoxy butanol [2] | 3-Methyl-3 methoxy butanol [2] | 3-Methyl-3 methoxy butanol [2] | 3-Methyl-3 methoxy butanol [2] |
| Antioxidant | DBPC [1.5] | DBPC [1.5] | DBPC [1.5] | DBPC [1.5] |
| Endurance | X | X | X | X |
| Cage sound after endurance test | ◊ | ◊ | ◊ | Δ |
| Compatibility with grease | X | X | X | X |
| Rotation torque | X | X | X | X |
| Initial cage sound | ◊ | ◊ | ◊ | Δ |
| Rust prevention | X | X | X | X |

TABLE 4

Unit of viscosity: cSt = mm$^2$ · S$^{-1}$

| | Comparative Examples | | |
|---|---|---|---|
| Composition | 9 | 10 | 11 |
| Rust preventive lubricating oil | | | |
| Base oil | Ester oil (12 cSt) [87.5] | Mineral oil (15 cSt) [87.5) | Mineral oil (120 cSt) [87.5] |
| Rust-preventive agent | Ca sulfonate [9] | Ca sulfonate [9] | Ca sulfonate [9] |
| Oiliness improver | | | |
| Alcoholic solvent | 3-Methyl-3 methoxy butanol [2] | 3-Methyl-3 methoxy butanol [2] | 3-Methyl-3 methoxy butanol [2] |
| Antioxidant | DBPC [1.5] | DBPC [1.5] | DBPC [1.5] |
| Endurance | Δ | X | X |
| Cage sound after endurance test | Δ | ◊ | ◊ |
| Compatibility with grease | X | X | X |
| Rotation torque | X | X | X |
| Initial cage sound | Δ | Δ | ◊ |
| Rust prevention | X | X | ◊ |

| | Comparative Examples | |
|---|---|---|
| Composition | 12 | 13 |
| Rust preventive lubricating oil | | |
| Base oil | Mineral oil (8 cSt) [87.5] | Mineral oil (8 cSt) [87.5] |
| Rust-preventive agent | Ca sulfonate [9] | Na sulfonate [9] |
| Oiliness improver | | |
| Alcoholic solvent | 3-Methyl-3 methoxy butanol [2] | 3-Methyl-3 methoxy butanol [2] |

TABLE 4-continued

| | Unit of viscosity: cSt = mm$^2$ · S$^{-1}$ | |
| --- | --- | --- |
| Antioxidant | DBPC [1.5] | DBPC [1.5] |
| Endurance | ◊ | X |
| Cage sound after endurance test | X | X |
| Compatibility with grease | X | X |
| Rotation torque | X | X |
| Initial cage sound | X | X |
| Rust prevention | X | Δ |

In the above Tables, the numeral in [ ] shows content based on the whole rust preventive lubricating oil and the numeral in ( ) shows viscosity at 40° C.

The rust preventive lubricating oils of the above Examples and Comparative Examples were applied to the following bearing and the bearing was tested.

Bearing used: Single row deep groove ball bearing of non-contact rubber seal type (V type); Bearing number: 695; Size: 5 mm in inner diameter×13 mm in outer diameter×4 mm in width.

Method of application of the rust preventive lubricating oil to the bearing and application amount:

The bearing was dipped in the rust preventive lubricating oil and taken out therefrom. Then, air was blown against the bearing to remove the excess rust preventive lubricating oil. Furthermore, the rust preventive lubricating oil remaining on the bearing was removed by centrifugation. Thus, the film thickness of the rust preventive lubricating oil applied to the bearing was adjusted to 0.1–20 μm and the amount of the oil applied to the inside of the bearing was adjusted to 2–3 mg.

(B) Test items:

The following various tests on characteristics were conducted.

(1) Test on endurance of bearing:
The number of revolution of bearing: 3600 rpm
Loading: 19.6N
The grease charged: Sodium-based grease (Charging amount: 16 mg)
Criteria of evaluation are as follows:
x: Longer than 10000 hours.
Δ: 2000–3000 hours.
◊: Shorter than 1000 hours.

(2) Test of measurement of cage sound:
The number of revolution of bearing: 1800–3600 rpm
Loading: 19.6N
The grease charged: Sodium-based grease (Charging amount: 16 mg)
Criteria of evaluation are as follows:
x: No sound occurred.
Δ: Sound occurred sometimes.
◊: Sound occurred.

(3) Test on compatibility with grease (amount of grease which leaked after revolution of bearing was measured):
The number of revolution of bearing: 3600 rpm
Loading: 19.6N
The grease charged: Sodium-based grease, lithium-based grease, urea-based grease (Charging amount: 16 mg)
Atmosphere: 60° C.×70% RH
Leaving time: 7 days
Criteria of evaluation are as follows:
x: No grease leaked.
Δ: A small amount of grease leaked.
◊: A large amount of grease leaked.

(4) Test of measurement of rotation torque:
The number of revolution of bearing: 3600 rpm
Loading: 19.6N
The grease charged: Sodium-based grease, lithium-based grease (Charging amount: 16 mg)
Criteria of evaluation are as follows:
x: 1–4×10$^{-2}$N·m
Δ: 5–10×10$^{-2}$N·m
◊: 11×10$^{-2}$N·m or more (5) Test on rust prevention:
Bearing: Inner ring and outer ring of bearing number 695
Atmosphere: Alternate repetition of cycles of leavingat 20° C.×90% RH (3 hours) and leaving at 50° C.×90 % RH (3 hours).
Leaving time: 7 days
Criteria of evaluation are as follows:
x: No rust developed.
Δ: Rust developed at several points.
◊: Much rust developed.

Results of the above tests are shown in Tables 1, 2, 3 and 4.

The following can be seen from Tables 1, 2, 3 and 4.

(a) Satisfactory results were obtained on all items of the tests for the bearings in which the rust preventive lubricating oils of the Examples were used. That is, they had excellent performances on endurance, cage sound, compatibility with grease, rotation torque and rust prevention.

(b) The rust preventive lubricating oils of Examples 1–4 in which the base oil comprised only an ether oil and the rust preventive lubricating oils of Examples 5–16 in which the base oil comprised a mixture of at least 20% by weight of an ether oil with other oil such as mineral oil, PAO or ester oil were all satisfactory in all test items and had no difference in performances.

On the other hand, in Comparative Examples 9–11 in which the base oil comprised only a mineral oil or an ether oil and Comparative Examples 5–8 in which the base oil comprised a mixture of less than 20% by weight of an ether oil with other oil such as mineral oil, PAO or ester oil, the cage produced a sound both initially and after the endurance test.

From the above results, it can be seen that the rust preventive lubricating oils prepared using a base oil comprising a mixture containing at least 20% by weight of an ether oil are lower in cost than and equal in performances to those prepared using a base oil comprising only an ether oil.

(c) In Comparative Example 1 where content of the rust-preventive agent was less than 2% by weight, much rust developed. The results of Comparative Examples 2 and 4 where content of the rust-preventive agent was more than 20% by weight were unsatisfactory in endurance, cage sound after the endurance test and compatibility with grease.

(d) The results of Comparative Example 3 where the oiliness improver was added in an amount of more than 10% by weight were inferior in endurance, cage sound after the endurance test and compatibility with grease as compared with those of Examples 11 and 12 where the same oiliness improver was added in an amount of 1–10% by weight.

(e) The rust preventive lubricating oils of the Examples where viscosity of the base oil was in the range of 10–100 cSt were superior in endurance and produced no cage sound while those of Comparative Examples 11 and 12 where viscosity of the base oil was outside the above range were unsatisfactory in endurance or initial cage sound and cage sound after the endurance test.

The rust preventive lubricating oils of the present invention are not limited to those of the above Examples and the similar effects can be obtained by using other base oils described hereinbefore.

The rust preventive lubricating oils of the present invention are simple in their composition, can be easily prepared and in addition, have excellent rust preventive action and lubricating action. Especially, when they are used for bearings, the characteristics of bearings and the lubricity of greases are not affected adversely and besides, sufficient rust preventive power is exhibited.

What is claimed is:

1. A rust preventive lubricating oil for ball bearings comprising:
    (a) base oil containing at least 20% by weight of alkyldiphenyl ether having viscosity of 10–100 $mm^2 \cdot S^{-1}$/40° C.;
    (b) 1–10% by weight of at least one oiliness improver selected from the group consisting of phosphoric acid esters, fatty acids, organic amines and organomolybdenum compounds;
    (c) 2–20% by weight of at least one rust-preventive agent selected from the group consisting of calcium sulfonate and barium sulfonate, wherein the % by weight of (b) and (c) are based on the whole rust-preventive lubricating oil.

2. A rust preventive lubricating oil according to claim 1, wherein the base oil contains at least one oil selected from the group consisting of mineral oil, synthetic hydrocarbon oil and ester oil.

3. A rust preventive lubricating oil according to claim 1, wherein the oiliness improver is selected from the group consisting of tricresyl phosphate, oleic acid, molybdenum dithiophate and stearylamine.

4. A rust preventive lubricating oil according to claim 1, wherein alcoholic solvent are additionally contained.

5. A lubricated ball bearing which has included on its surface a rust preventive lubricating oil according to any one of claims 1 to 4.

* * * * *